United States Patent
Hashimoto et al.

(10) Patent No.: US 9,960,433 B2
(45) Date of Patent: May 1, 2018

(54) GAS CHANNEL FORMING MEMBER FOR FUEL CELLS, AND FUEL CELL

(71) Applicants: Keiji Hashimoto, Kariya (JP);
Kousuke Kawajiri, Kariya (JP);
Satoshi Futami, Kariya (JP)

(72) Inventors: Keiji Hashimoto, Kariya (JP);
Kousuke Kawajiri, Kariya (JP);
Satoshi Futami, Kariya (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 103 days.

(21) Appl. No.: 14/780,046

(22) PCT Filed: Jun. 19, 2014

(86) PCT No.: PCT/JP2014/066340
§ 371 (c)(1),
(2) Date: Sep. 25, 2015

(87) PCT Pub. No.: WO2015/005094
PCT Pub. Date: Jan. 15, 2015

(65) Prior Publication Data
US 2016/0043412 A1      Feb. 11, 2016

(30) Foreign Application Priority Data
Jul. 8, 2013   (JP) ................. 2013-142742

(51) Int. Cl.
*H01M 8/02* (2016.01)
*H01M 8/04* (2016.01)
(Continued)

(52) U.S. Cl.
CPC ..... *H01M 8/0258* (2013.01); *H01M 8/04156* (2013.01); *H01M 8/1004* (2013.01);
(Continued)

(58) Field of Classification Search
CPC ............. H01M 8/0258; H01M 8/04156
(Continued)

(56) References Cited

U.S. PATENT DOCUMENTS

| 9,190,680 B2 | 11/2015 | Hashimoto et al. |
| 2007/0224474 A1 | 9/2007 | Yang et al. |

(Continued)

FOREIGN PATENT DOCUMENTS

| JP | 11-73979 A | 3/1999 |
| JP | 2001-185169 A | 7/2001 |

(Continued)

OTHER PUBLICATIONS

Machine Translation of JP 2011-165559 originally published to Kawajiri et al. on Aug. 25, 2011.*
(Continued)

*Primary Examiner* — Jonathan G Leong
(74) *Attorney, Agent, or Firm* — Patterson Thuente Pederson, P.A.

(57) ABSTRACT

A gas channel forming member is located between a separator and a membrane electrode assembly. The gas channel forming member includes gas channels, which are arranged in parallel with each other on a surface that faces the membrane electrode assembly, water channels, which are formed on a surface that faces the separator, and inner communication passages. The water channels are each located between adjacent two of the gas channels. The inner communication passages communicate the gas channels and the water channels with each other. Each water channel is formed such that the flow cross-sectional area in an outlet section including an outlet opening is larger than the cross-sectional area of an upstream section, which is upstream of an adjacent to the outlet section in the flow direction of the oxidant gas.

5 Claims, 6 Drawing Sheets

(51) Int. Cl.
*H01M 8/0258* (2016.01)
*H01M 8/2457* (2016.01)
*H01M 8/241* (2016.01)
*H01M 8/1004* (2016.01)
*H01M 8/04119* (2016.01)
*H01M 8/1018* (2016.01)

(52) U.S. Cl.
CPC ......... *H01M 8/241* (2013.01); *H01M 8/2457* (2016.02); *H01M 2008/1095* (2013.01)

(58) Field of Classification Search
USPC .......................................................... 429/514
See application file for complete search history.

(56) References Cited

U.S. PATENT DOCUMENTS

| | | | |
|---|---|---|---|
| 2009/0098435 A1 | 4/2009 | Shibata et al. | |
| 2012/0301806 A1 | 11/2012 | Okabe | |
| 2014/0017582 A1 | 1/2014 | Hashimoto et al. | |
| 2015/0333357 A1 | 11/2015 | Hashimoto et al. | |

FOREIGN PATENT DOCUMENTS

| | | |
|---|---|---|
| JP | 2003-077498 A | 3/2003 |
| JP | 2004-039540 A | 2/2004 |
| JP | 2004-146245 A | 5/2004 |
| JP | 2007-234405 A | 9/2007 |
| JP | 2007-250259 A | 9/2007 |
| JP | 2008-171638 A | 7/2008 |
| JP | 2009-037759 A | 2/2009 |
| JP | 2009-054601 A | 3/2009 |
| JP | 2011-150801 A | 8/2011 |
| JP | 2011-165559 A | 8/2011 |
| JP | 2012-226914 A | 11/2012 |
| WO | WO 2012/160607 A1 | 11/2012 |
| WO | WO 2014/013747 A1 | 1/2014 |

OTHER PUBLICATIONS

"Environmentally Conscious New Materials Series, Fuel Cell Material," Nikkan Kogyo Shimbun, 2007, First edition, p. 125.

Extended European Search Report for application No. EP 14822906.5, dated Feb. 10, 2017 (8 pages).

"Fuel Cell technology, Problems and Countermeasures of Solid Polymer Type," Tokyo Denki University Press, 2010, First Edition, p. 46.

Japanese Office Action for Application No. 2013-142742, dated Dec. 6, 2015, (Office Action 5 pages, Tranlsation 1 page).

Japanese Office Action for Application No. 2013-142742, dated May 15, 2017 and English Language Machine Translation (Office Action—5 pgs, Machine Translation—4 pgs) 9 pgs total.

PCT International Search Report (3 pages) with English translation (2 pages) for International Application No. PCT/JP2014/066340, dated Jul. 29, 2014, 5 total pages.

International Preliminary Report on Patentability, for International Application No. PCT/JP2014/066340, filed Jun. 19, 2014, 4 pages.

\* cited by examiner

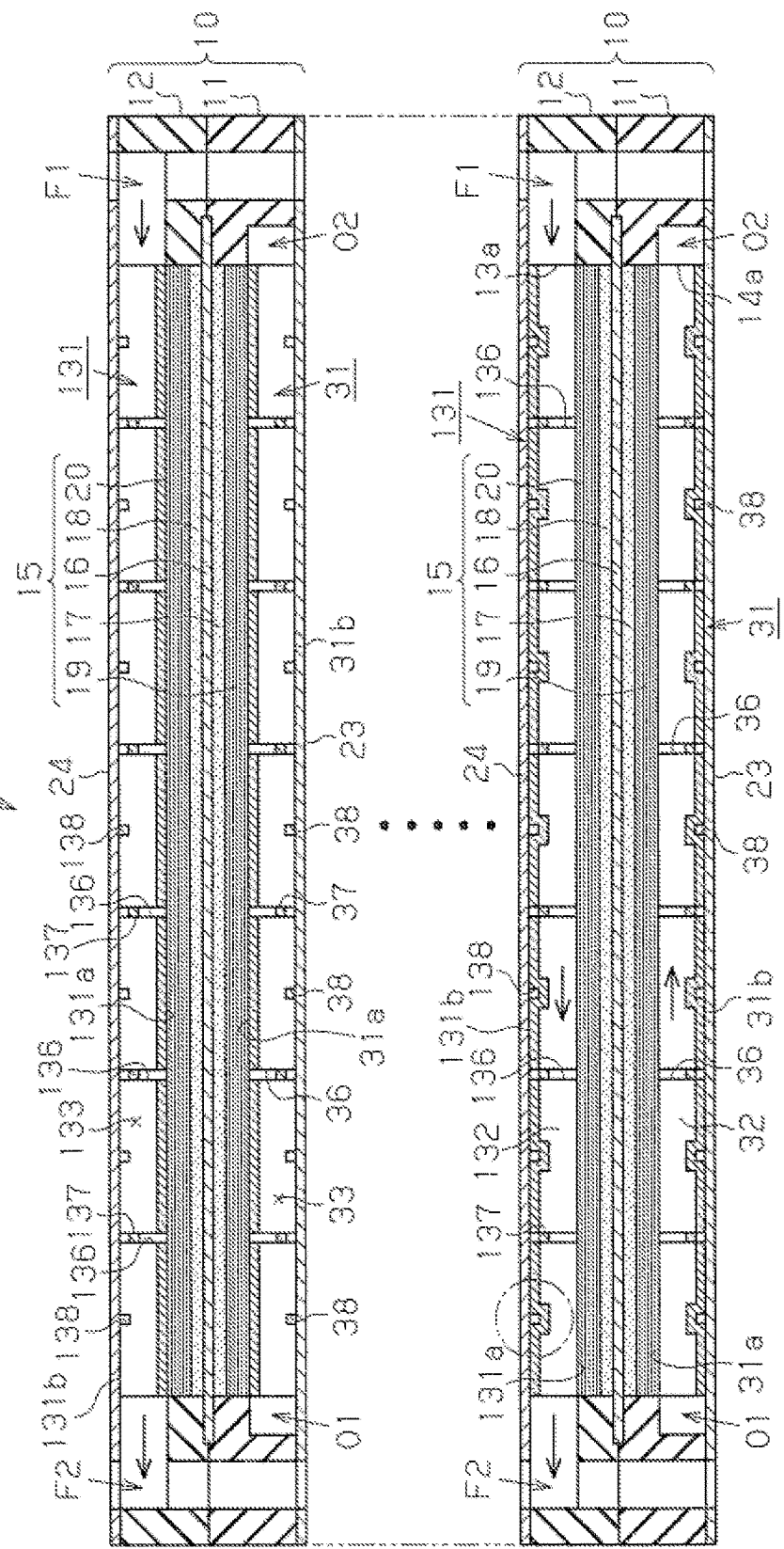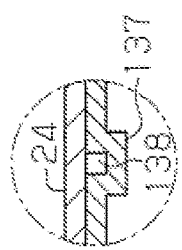
Fig.1A
Fig.1B

GAS CHANNEL FORMING MEMBER FOR FUEL CELLS, AND FUEL CELL

RELATED APPLICATIONS

The present application is a National Phase entry of PCT Application No. PCT/JP2014/066340, filed Jun. 19, 2014, which claims priority to JP 2013-142742, filed Jul. 8, 2013, all said applications being hereby incorporated herein by reference in their entireties.

TECHNICAL FIELD

The present invention relates to a gas channel forming member for a polymer electrolyte fuel cell and to a fuel cell.

BACKGROUND ART

A polymer electrolyte fuel cell includes cells, and each cell is configured by a membrane electrode assembly, a pair of gas channel forming members for holding the membrane electrode assembly in between, and a pair of separators for holding the gas channel forming members in between. The polymer electrolyte fuel cell is configured by stacking the cells together (see, for example, Patent Document 1).

The membrane electrode assembly is configured by holding a polymer electrolyte membrane between a pair of electrode catalyst layers and is referred to as MEA. A gas diffusion layer is arranged on each of an anode-side surface and a cathode-side surface of the membrane electrode assembly.

In each of the gas channel forming members, a gas channel, through which fuel gas or oxidant gas flows, is formed between the surface facing the membrane electrode assembly and the membrane electrode assembly. In each gas channel forming member, a water channel for discharging generated water, which is generated through power generation, is formed between the surface facing the corresponding separator and the separator. A communication passage, which allows the gas channel and the water channel to communicate with each other, is formed in the gas channel forming member. The generated water, which is generated in the membrane electrode assembly through power generation, flows into the gas channel. Some of the generated water flows into the water channel through the communication passage and is discharged to the exterior via the water channel using flow pressure of the fuel gas or oxidant gas, which flows through the water channel.

PRIOR ART DOCUMENTS

Patent Documents

Patent Document 1: Japanese Laid-Open Patent Publication No. 2011-150801

SUMMARY OF THE INVENTION

In such a fuel cell, the amount of generated water increases when the flow rate of fuel gas or oxidant gas increases, for example, at the time of a high load operation. This may cause the discharge amount of the generated water via the water channel to become smaller than the generation amount of generated water. Some of the generated water is thus retained without being discharged and may flow back into the gas channel via the communication passage, thus blocking the gas channel. This hampers diffusion of the fuel gas or oxidant gas in the membrane electrode assembly through the gas diffusion layer, which decreases cell performance of the fuel cell.

Accordingly, it is an objective of the present invention to provide a gas channel forming member for a fuel cell and a fuel cell capable of improving discharge performance of generated water and restraining increase of gas pressure loss in a gas channel.

To achieve the foregoing objective and in accordance with one aspect of the present invention, a gas channel forming member for a fuel cell is provided. The fuel cell has a separator and a membrane electrode assembly configured by holding a polymer electrolyte membrane between a pair of electrode catalyst layers. The gas channel forming member is arranged between the membrane electrode assembly and the separator. The gas channel forming member includes a plurality of gas channels, which is formed on a surface facing the membrane electrode assembly, a plurality of water channels, which is formed on a surface facing the separator, and a communication passage. Each water channel has an outlet opening. The communication passage allows the gas channels and the water channels to communicate with each other. Fuel gas or oxidant gas flows through the gas channels. The water channels discharge generated water. A flow cross-sectional area of the outlet opening of each water channel is greater than a flow cross-sectional area of an upstream section, which is adjacent to the outlet opening at an upstream side in a flow direction of the gas.

Droplets of generated water at the outlet opening of the water channel become greater in size as the flow cross-sectional area of the outlet opening becomes larger. In the above-described configuration, the flow cross-sectional area of the outlet opening of the water channel is greater than the flow cross-sectional area of the section upstream from the outlet opening. The size of droplets of generated water at the outlet opening is thus greater than the size of droplets of generated water in the section upstream from the outlet opening. This decreases surface tension of droplets of the generated water, which is adhesion force acting between droplets and the peripheral portion of the outlet opening of the water channel. As a result, the pressure necessary for pushing droplets out of the outlet opening of the water channel is reduced. The generated water is thus discharged to the exterior through the water channel using the gas even if the flow rate or flow pressure of the gas is low.

If the flow cross-sectional area of the water channel is increased in the extending direction throughout the water channel, the flow cross-sectional area of the gas channel is correspondingly decreased throughout the gas channel in the extending direction of the gas channel. This increases pressure loss of gas in the gas channel compared to the pressure loss in the original gas passage. In the above-described configuration, the upstream section of the water channel, unlike the outlet opening, is formed without an increased flow cross-sectional area. The configuration thus restrains increase in the pressure loss of the gas in the gas channel.

Effects of the Invention

The present invention thus improves discharge performance of generated water and restrains increase of gas pressure loss in a gas channel.

BRIEF DESCRIPTION OF THE DRAWINGS

FIGS. 1A and 1B are cross-sectional views showing a fuel cell 1 of a first embodiment;

DETAILED DESCRIPTION OF THE PREFFERED EMBODIMENTS

First Embodiment

Figure 2:
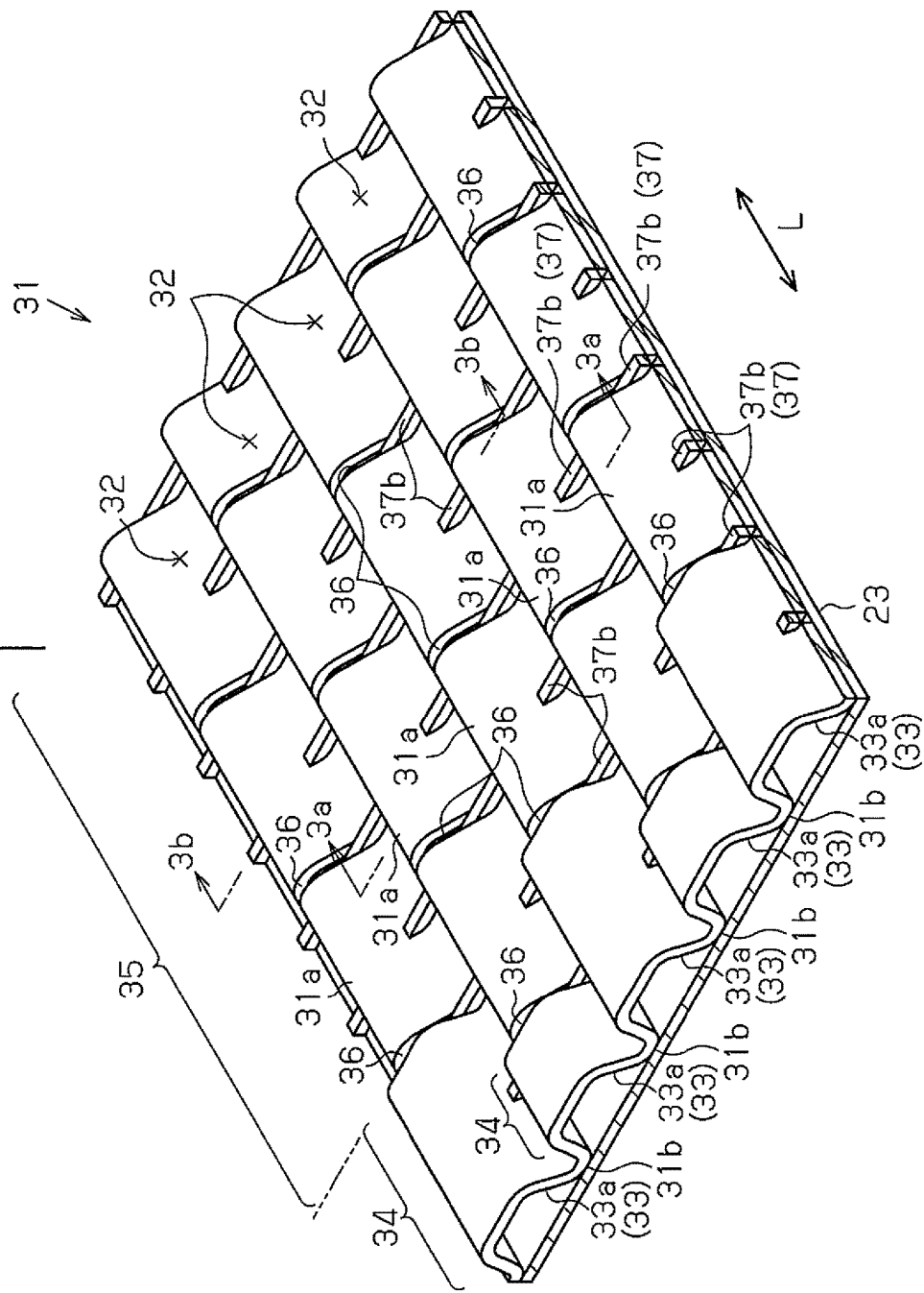
FIG. 2 is a cross-sectional perspective view showing a first gas channel forming member and a first separator of the first embodiment.

Gas channel forming members 31, 131 of a fuel cell 1 according to a first embodiment and the fuel cell 1 will now be described with reference to FIGS. 1A to 6.

As shown in FIG. 1A, a polymer electrolyte fuel cell 1 is configured by stacking a plurality of cells 10 together. The upper cell 10 in FIG. 1A has a cross-sectional shape taken along such a line that water channels 33, 133, which will be discussed below, are visible. The lower cell 10 in FIG. 1A has a cross-sectional shape taken along such a line that gas channels 32, 132, which will be discussed below, are visible.

Each of the cells 10 has a first frame 11 and a second frame 12, both of which are shaped as a rectangular frame. A membrane electrode assembly 15 is arranged in the frames 11, 12. An outer peripheral edge of the membrane electrode assembly 15 is held by the first frame 11 and the second frame 12.

A supply passage F1 for supplying fuel gas from a non-illustrated fuel gas supply source to the gas channel 32 and a discharge passage F2 for discharging fuel gas that has not been used for power generation to the exterior are formed in the frames 11, 12 and separators 23, 24 of each cell 10.

A supply passage O1 for supplying oxidant gas from a non-illustrated oxidant gas supply source to the gas channel 32 and a discharge passage O2 for discharging fuel gas that has not been used for power generation to the exterior are formed in the frame 11 and the separator 23 of each cell 10.

A first gas channel forming member 31, through which oxidant gas flows, is arranged at a cathode-side surface (at the lower side as viewed in FIG. 1A) of each membrane electrode assembly 15. A second gas channel forming member 131, through which fuel gas (hydrogen gas) flows, is arranged at an anode-side surface (at the upper side as viewed in the drawing) of the membrane electrode assembly 15.

A first separator 23, which is flat and configured by a metal plate, is arranged at the side of each first gas channel forming member 31 opposite to the membrane electrode assembly 15 (at the lower side as viewed in FIG. 1A). A second separator 24, which is flat and configured by a metal plate, is arranged at the side of each second gas channel forming member 131 opposite to the membrane electrode assembly 15 (at the upper side as viewed in the drawing). Each of the gas channel forming members 31 is thus arranged between the corresponding membrane electrode assembly 15 and separator 23. Each of the gas channel forming members 131 is arranged between the corresponding membrane electrode assembly 15 and separator 24.

Each of the membrane electrode assemblies 15 has a polymer electrolyte membrane 16. Each of the polymer electrolyte membranes 16 is held by a first electrode catalyst layer 17 and a second electrode catalyst layer 18 from the cathode side and the anode side, respectively. A first gas diffusion layer 19 is arranged on a surface of each of the first electrode catalyst layers 17. A second gas diffusion layer 20 is arranged on a surface of each of the second electrode catalyst layers 18.

The structure of each gas channel forming member 31, 131 will hereafter be described. In the first embodiment, the first gas channel forming member 31 and the second gas channel forming member 131 have the same structure. The description below will thus focus on the configuration of the first gas channel forming member 31. Reference numerals "13*", which are obtained by adding "100" to reference numerals of components of the first gas channel forming member 31, are given to corresponding components of the second gas channel forming member 131 and redundant description is omitted herein. The first gas channel forming member 31 and the first separator 23 are referred to in short simply as the gas channel forming member 31 and the separator 23, respectively.

Figure 3A:
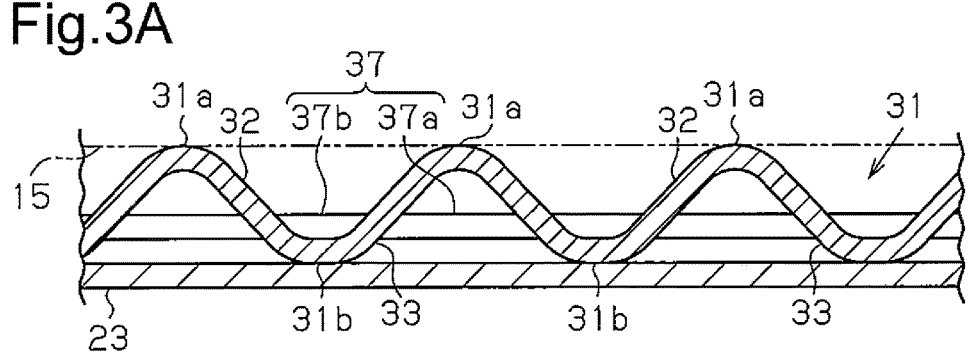
FIG. 3A is a cross-sectional view taken along line 3a-3a of FIG. 2.
Figure 3B:
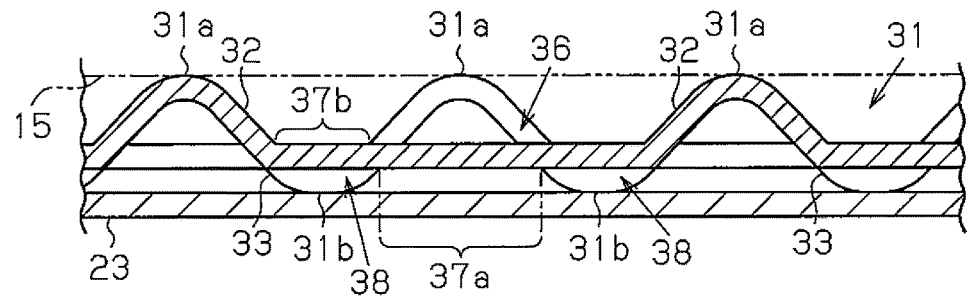
FIG. 3B is a cross-sectional view taken along line 3b-3b of FIG. 2.

As illustrated in FIGS. 2, 3A, and 3B, the gas channel forming member 31 has a substantially corrugated cross section as a whole and is formed by press-molding a single metal plate. As a result, in the gas channel forming member 31, inner protrusions 31a, which are arranged in parallel, protrude toward the membrane electrode assembly 15 (upward as viewed in FIG. 3A) and are held in contact with the membrane electrode assembly 15. Gas channels 32, through which oxidant gas flows, are each formed between an adjacent pair of the inner protrusions 31a. In the gas channel forming member 31, outer protrusions 31b, which are arranged in parallel, protrude toward the separator 23 (downward as viewed in FIG. 3A) and are held in contact with the first separator 23. Water channels 33 for discharging water generated in the membrane electrode assembly 15 (hereinafter, referred to as generated water W) are each formed between an adjacent pair of the outer protrusions 31b.

With reference to FIGS. 2 and 3, ribs 37, which extend perpendicular to the extending direction L of each of the protrusions 31a, 31b, are formed in the gas channel forming member 31. The ribs 37 are formed by shear-bending each protrusion 31a and corresponding portions of the protrusions 31b that are located adjacent to the protrusion 31a at opposite sides of the protrusion 31a.

As illustrated in FIGS. 3A and 3B, communication passages 36, 38 are formed in the gas channel forming member 31 by punching the corresponding ribs 37. That is, each of the ribs 37 has an outer section 37a, which is inside the corresponding water channel 33, and an inner section 37b, which is inside the corresponding gas channel 32.

Referring to FIGS. 1A, 1B and 3B, in each outer protrusion 31b, an outer communication passage 38, which allows an adjacent pair of the water channels 33 to communicate with each other, is formed directly below the inner section 37b of the associated rib 37. In each inner protrusion 31a, an inner communication passage 36, which allows the corresponding gas channel 32 and water channel 33 to communicate with each other, is formed directly above the outer section 37a of the associated rib 37.

As illustrated in FIGS. 2, 3A, and 3B, the ribs 37 are located closer to the vertices of the outer protrusions 31b than to the vertices of the inner protrusions 31a in the direction of the thickness of the gas channel forming member 31 (in the vertical direction as viewed in FIGS. 3A and 3B). The flow cross-sectional area of each outer section 37a is thus greater than the flow cross-sectional area of each inner section 37b as illustrated in FIGS. 3A and 3B. Thus, the pressure loss in the water channels 33 as a whole is greater than that in the gas channels 32 as a whole, even if the gas channels 32 and the water channels 33 have the same flow cross-sectional area at the positions without the ribs 37. As a result, the oxidant gas flows mainly through the gas channels 32, which cause a comparatively small pressure loss.

Each inner communication passage 36 is shaped and sized such that the pressure loss in each communication passage 36 exceeds the pressure loss in each gas channel 32.

With reference to FIG. 2, in the aforementioned extending direction L, the distance between each adjacent pair of the inner communication passages 36 (between each adjacent pair of the outer sections 37a of the ribs 37) is set to a value twice as great as the distance between each adjacent pair of the inner sections 37b of the ribs 37 (each adjacent pair of the outer communication passages 38). In the extending direction L and the direction perpendicular to the extending direction L, the inner communication passages 36 (the outer sections 37a) of the ribs 37 are each arranged in every other one of the inner sections 37b (the outer communication passages 38) of the ribs 37.

Figure 4A:
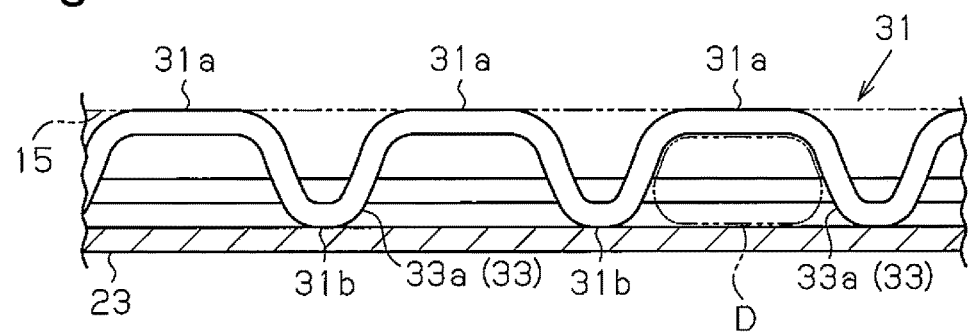
FIG. 4A is a diagram showing end faces of outlet sections of water channels of the first gas channel forming member of the first embodiment.

With reference to FIGS. 2, 3, and 4A, in each water channel 33 of the gas channel forming member 31, the flow cross-sectional area of an outlet section 34 including an outlet opening 33a, is greater than the flow cross-sectional area of an upstream section 35, which is adjacent to the outlet section 34 at the upstream side in the flow direction of the oxidant gas. As illustrated in FIG. 2, each of the outlet sections 34 is formed throughout the section of the associated one of the inner protrusions 31a extending from the most downstream one of the inner communication passages 36 to the outlet opening 33a. The flow cross-sectional area of the outlet section 34 of each water channel 33 is thus discretely increased in relation to the flow cross-sectional area of the upstream section 35.

Figure 5A:
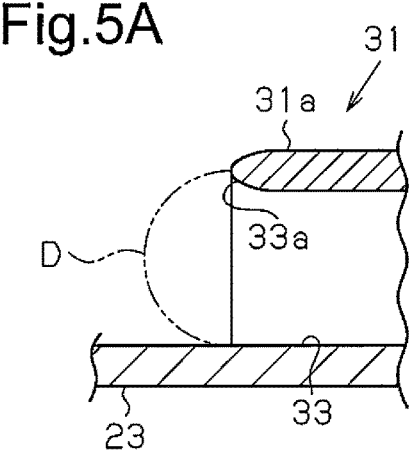
FIG. 5A is a cross-sectional view showing the outlet section of the water channel of the first embodiment.
Figure 5B:
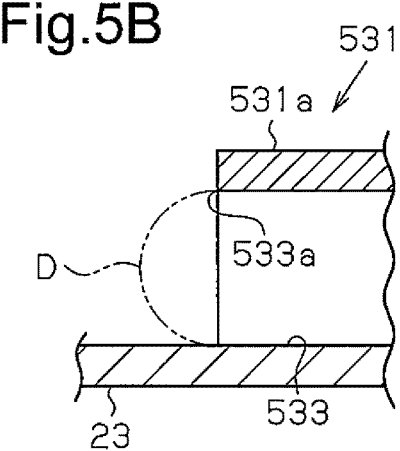
FIG. 5B is a cross-sectional view showing the outlet section of the water channel of the comparative example.

Referring to FIG. 5A, the outlet opening 33a of each water channel 33 of the gas channel forming member 31 has a chamfered peripheral portion.

Operation of the first embodiment will now be described.

As illustrated at the lower side of FIG. 1A, fuel gas is supplied to each gas channel 132 through the corresponding supply passage F1 and then flows into the second gas diffusion layer 20 via the gas channels 132. The fuel gas is diffused while passing through the second gas diffusion layer 20 and thus supplied to the second electrode catalyst layer 18.

Oxidant gas is supplied to each gas channel 32 via the corresponding supply passage O1, diffused while passing through the first gas diffusion layer 19, and supplied to the first electrode catalyst layer 17.

In this manner, the fuel gas and the oxidant gas are supplied to the membrane electrode assembly 15, thus causing power generation in the membrane electrode assembly 15 through electrode reaction. The generated water W, which is generated through the power generation, flows into the gas channels 32 of the first gas channel forming member 31 at the cathode side.

Figure 6A:
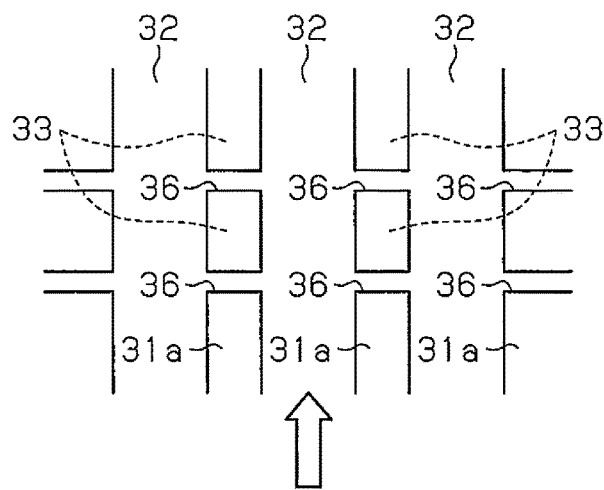
FIGS. 6A and 6B are schematic diagrams each showing a gas channel and an inner communication passage.
Figure 6B:
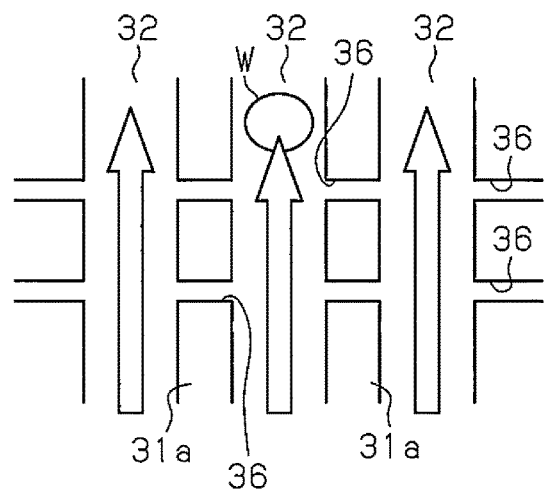

With reference to FIGS. 6A and 6B, some of the generated water W flows through the gas channels 32 using flow pressure of the oxidant gas flowing through the gas channels 32. After having flowed through the gas channels 32, the generated water W is discharged to the exterior via the discharge passage O2. As has been described, the pressure loss in each inner communication passage 36 is set greater than the pressure loss in each gas channel 32. This causes the oxidant gas to flow mainly through the gas channels 32, as illustrated in FIG. 6B. Much of the generated water W in the gas channels 32 is thus pushed by the oxidant gas and thus moves in the gas channels 32 toward the discharge passage O2. Some of the generated water W flows into the water channels 33 via the inner communication passages 36. The generated water W in the water channels 33 is pushed by the oxidant gas flowing through the water channels 33 and thus moves in the water channels 33 toward the discharge passage O2.

Figure 4B:
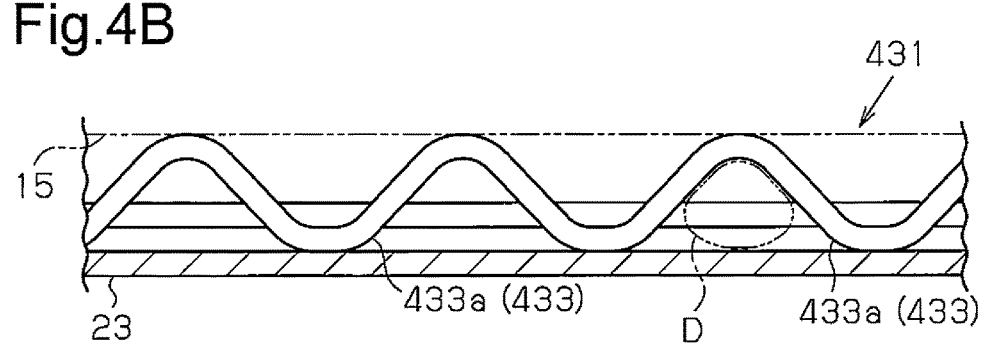
FIG. 4B is a diagram showing end faces of outlet sections of water channels of a first gas channel forming member of a comparative example.

FIG. 4B shows the configuration of the end faces of outlet sections of water channels 433 of a first gas channel forming member 431 of a comparative example. As illustrated in the drawing, the flow cross-sectional area of each of the water channels 433 at the end face is constant throughout the water channel 433 in the extending direction of the water channel 433. The flow cross-sectional area of an outlet opening 433a of each water channel 433 of the comparative example is equal to the flow cross-sectional area of the upstream section 35 of each water channel 33 of the first embodiment.

The size of the droplet D of the generated water W at the outlet opening 33a of each water channel 33 becomes greater as the flow cross-sectional area of the outlet opening 33a becomes greater.

As illustrated in FIG. 2, in the first gas channel forming member 31 of the first embodiment, the flow cross-sectional area of the outlet section 34 of each water channel 33 is greater than the flow cross-sectional area of the upstream section 35. As a result, the size of the droplet D of the generated water W at each outlet opening 33a of the first gas channel forming member 31 of the first embodiment is greater than that of the comparative example, as represented by the long dashed double-short dashed lines in FIGS. 4A and 4B.

Further, as shown in FIG. 5A, in the first gas channel forming member 31 of the first embodiment, the outlet opening 33a of each water channel 33 has the chamfered peripheral portion. Thus, the size of the droplet D of the generated water W at the outlet opening 33a of each water channel 33, as represented by the long dashed double-short dashed line in FIG. 5A, is larger than the corresponding size of the first gas channel forming member 531 (FIG. 5B) of the comparative example, in which the outlet opening 533a of each water channel 533 has no chamfered peripheral portion.

As a result, surface tension of each droplet D of the generated water W, which is adhesion force acting between the droplet D and the peripheral portion of the outlet opening 33a of the corresponding water channel 33, decreases. This decreases the pressure necessary for pushing the droplet D out of the outlet opening 33a of the water channel 33. The generated water W is thus discharged to the exterior through the water channel 33 by means of oxidant gas even if the flow rate or flow pressure of the oxidant gas is comparatively low.

With reference to FIG. 1A, some of the generated water W, which is generated through power generation, flows into the gas channels 132 of the second gas channel forming member 131 at the anode side through the second electrode catalyst layer 18 and the second gas diffusion layer 20. In the first embodiment, the second gas channel forming member 131 has the same structure as the first gas channel forming member 31. This ensures the same operation of the gas channels 132 and the water channels 133 at the anode side as the aforementioned operation of the gas channels 32 and the water channels 33 at the cathode side.

The gas channel forming members 31, 131 of the fuel cell 1 and the fuel cell 1 according to the first embodiment, which have been described, have the advantages described below.

(1) Each gas channel forming member 31 has gas channels 32, water channels 33, and inner communication passages 36. The gas channels 32 are arranged in parallel on the surface of the gas channel forming member 31 facing the membrane electrode assembly 15. The water channels 33 are each arranged between an adjacent pair of the gas channels 32 on the surface of the gas channel forming member 31 facing the separator 23. The inner communication passages 36 allow the corresponding gas channels 32 and water channels 33 to communicate with each other. Oxidant gas flows through each of the gas channels 32. Each of the water channels 33 discharges the generated water W. In each water channel 33, the flow cross-sectional area of the outlet section 34 including the outlet opening 33a is greater than the flow cross-sectional area of the upstream section 35, which is adjacent to the outlet section 34 at the upstream side in the flow direction of the oxidant gas.

This configuration decreases the pressure necessary for pushing out the droplet D through the outlet opening 33a of each water channel 33. The generated water W is thus discharged to the exterior through the water channels 33 by means of the oxidant gas even if the flow rate or flow pressure of the oxidant gas is comparatively small. Unlike the outlet sections 34, the upstream section 35 of each water channel 33 is formed without an increased flow cross-sectional area. This restrains increase of gas pressure loss in each gas channel 32. As a result, this configuration improves discharge performance of the generated water W and restrains increase of gas pressure loss in the gas channels 32. This restrains overflow of the generated water W into the gas channels 32, promotes diffusion of the fuel gas and oxidant gas, and improves cell performance.

(2) The outlet opening 33a of each water channel 33 has a chamfered peripheral portion. This configuration enlarges the size of the droplet D of the generated water W at the outlet opening 33a of each water channel 33 compared to a configuration without a chamfered peripheral portion formed in the outlet opening 33a. As a result, adhesion force acting between the droplet D of the generated water W and the peripheral portion of the outlet opening 33a of each water channel 33 is further decreased. The generated water W is thus discharged by means of gas even if the flow rate or pressure loss of the gas is comparatively small.

Second Embodiment

A second embodiment will now be described with reference to FIGS. 7 to 9.

The second embodiment is different from the first embodiment in terms of the configurations of gas channel forming members 231, 331. The description below will focus on this difference. In FIGS. 7 to 9, identical reference numerals are given to components of the second embodiment that are identical with corresponding components of the first embodiment. Reference numerals "2" and "3", which are obtained by adding "200" to reference numerals of components of the first embodiment, are given to the components of the second embodiment that correspond to the components of the first embodiment and redundant description is omitted herein.

Also in the second embodiment, the first gas channel forming member 231 and the second gas channel forming member 331 have the same structure. The description below will thus focus on the configuration of the first gas channel forming member 231. Reference numerals "33*" and "34*", which are obtained by adding "100" to reference numerals of components of the first gas channel forming member 231, are given to corresponding components of the second gas channel forming member 331 and redundant description is omitted herein. The first gas channel forming member 231 and the first separator 23 are referred to in short simply as the gas channel forming member 231 and the separator 23, respectively.

Figure 7:
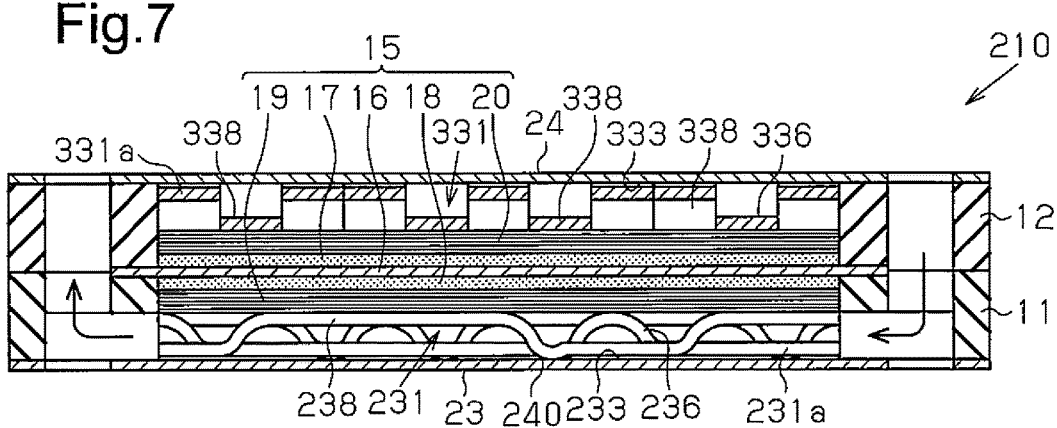
FIG. 7 is a cross-sectional view showing a cell 210 of a fuel cell 1 of a second embodiment.
Figure 8:
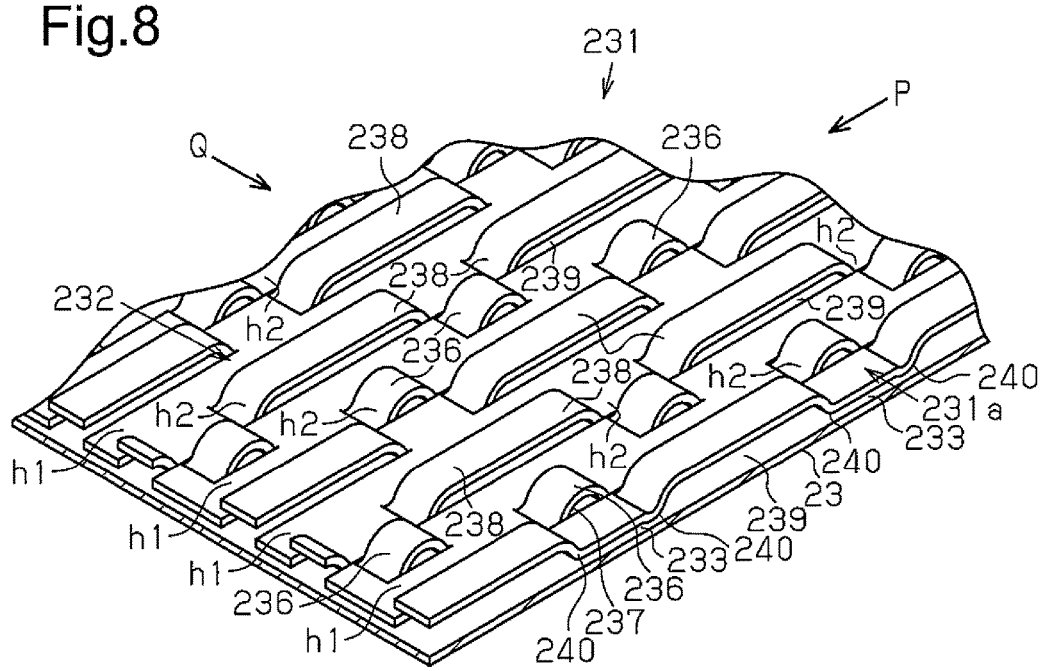
FIG. 8 is a cross-sectional perspective view showing a first gas channel forming member of the second embodiment.

As illustrated in FIGS. 7 and 8, a first gas channel forming member 231 of each cell 210 is formed by shear-bending a metal plate. First projecting portions 236 and second projecting portions 238, each of which projects toward the membrane electrode assembly 15, are formed on a flat base portion 231a.

With reference to FIG. 8, the second projecting portions 238 are spaced apart at predetermined intervals in the flow direction of oxidant gas (hereinafter, referred to as the gas flow direction P), which extends from the non-illustrated supply passage O1 to the discharge passage O2. The rows of the second projecting portions 238 are spaced apart at predetermined intervals in the direction perpendicular to the gas flow direction P (hereinafter, referred to as the perpendicular direction Q). Each one of the second projecting portions 238 is arranged offset by a half cycle in the gas flow direction P with respect to an adjacent one of the second projecting portions 238 in the perpendicular direction Q.

The first projecting portions 236 are provided two by two in the clearances between the corresponding adjacent pairs of the second projecting portions 238 in the perpendicular direction Q. Each one of the first projecting portions 236 is arranged offset by a half cycle in the gas flow direction P with respect to an adjacent one of the first projecting portions 236 in the perpendicular direction Q.

As illustrated in FIG. 7, the first projecting portions 236 and the second projecting portions 238 are each held in contact with the membrane electrode assembly 15. Gas channels 232, through which oxidant gas flows, are formed between the base portion 231a and the membrane electrode assembly 15.

Referring to FIG. 8, the gas channels 232 are configured by main channels h1 each extending in the gas flow direction P and sub-channels h2 each allowing an adjacent pair of the main channels h1 in the perpendicular direction Q to communicate with each other.

Figure 9:
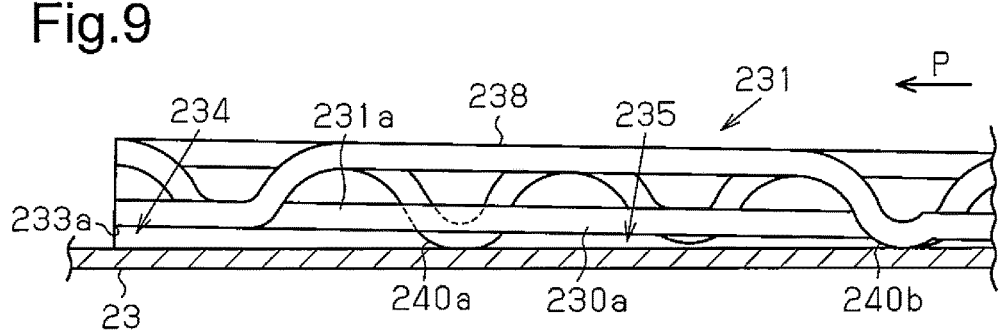
FIG. 9 is a cross-sectional view mainly showing an outlet section of a water channel of the second embodiment.

As shown in FIGS. 7 to 9, projections 240 are formed in the first gas channel forming member 231 to project toward the first separator 23. The projections 240 are formed at the upstream ones of the ends of the corresponding first projecting portions 236 and second projecting portions 238 in the gas flow direction P.

The projections 240 are held in contact with the first separator 23. Water channels 233 are formed between the base portion 231a and the first separator 23. The distance between the base portion 231a and the first separator 23 is approximately 20 to 90 μm.

As illustrated in FIG. 8, a communication hole 237 and a communication hole 239 are formed in the opposite sides of each first projecting portion 236 and the opposite sides of each second projecting portion 238, respectively. The communication holes 237, 239 allow the gas channels 232 and the corresponding water channels 233 to communicate with each other.

In the second embodiment, referring to FIG. 9, the height from the base portion 231a of a projection 240a, which is close to an outlet opening 233a of each water channel 233, is greater than the height from the base portion 231a of a projection 240b, which is spaced from the outlet opening 233a. The flow cross-sectional area of each water channel 233 is greater at the location of the projection 240a on the downstream side of the gas flow direction P (at the left side as viewed in FIG. 9) than at the location of the projection 240b on the upstream side of the gas flow direction P (at the right side as viewed in the drawing). As a result, in the water channel 233 as a whole, the flow cross-sectional area of an outlet section 234 including the outlet opening 233a is greater than the flow cross-sectional area of an upstream section 235, which is located upstream from the outlet section 234.

The gas channel forming members 231, 331 of the fuel cell 1 and the fuel cell 1 according to the second embodiment, which have been described, have an advantage similar to the advantage (1) of the first embodiment.

The gas channel forming members 31, 131 (231, 331) of the fuel cell 1 and the fuel cell 1 according to the present invention are not restricted to the configurations illustrated in the above-described embodiments and may be embodied in forms modified from the configurations as needed, which include, for example, the forms described below.

Figure 10:
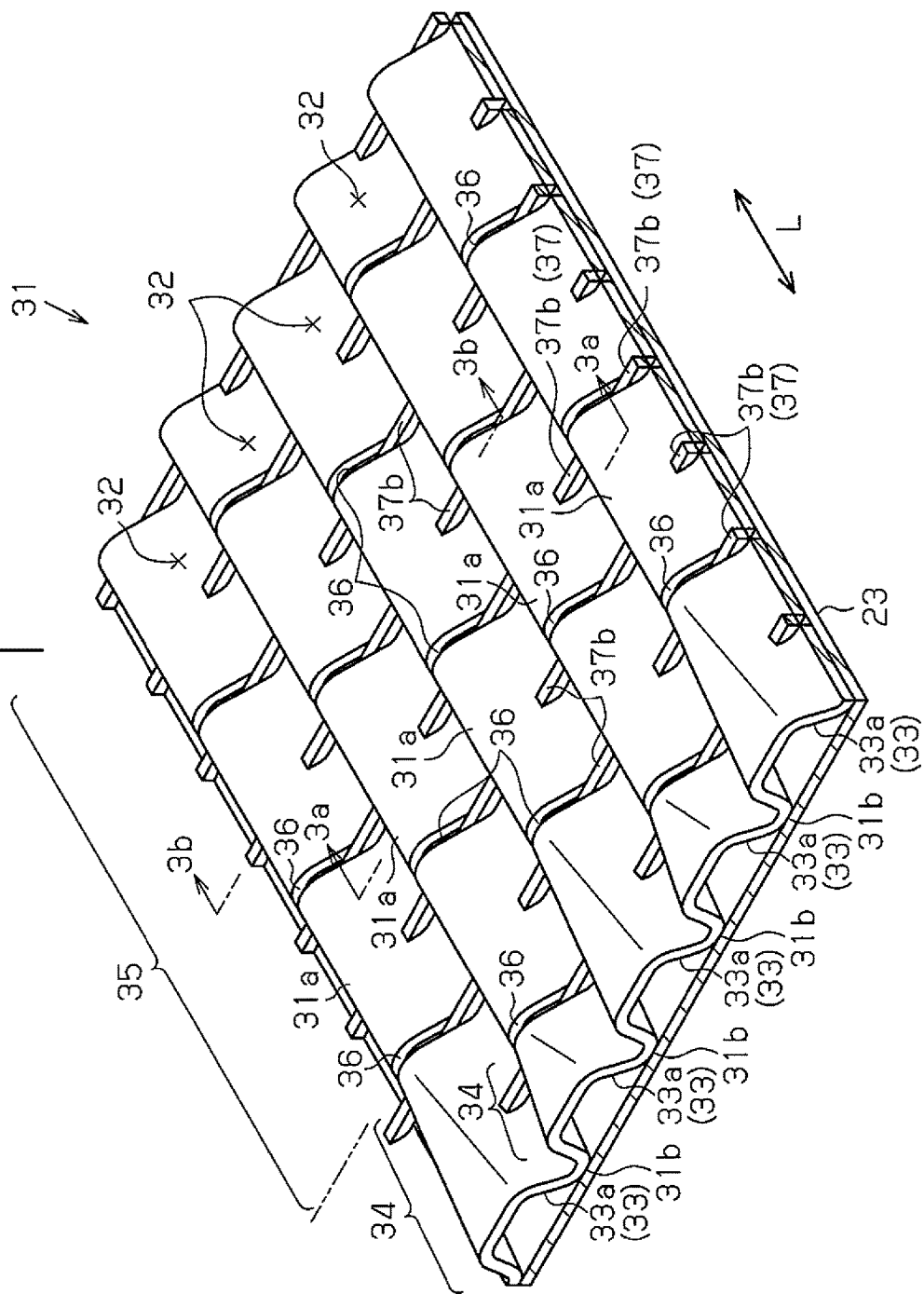
FIG. 10 is a cross-sectional perspective view showing a first gas channel forming member and a first separator of another embodiment.

In the first embodiment, the flow cross-sectional area of the outlet section 34 of each water channel 33 is discretely increased in relation to the flow cross-sectional area of the upstream section 35. However, the flow cross-sectional area of the section including the outlet opening of each water channel 33 may be increased gradually toward the outlet opening as illustrated in FIG. 10, for example.

In the illustrated embodiments, the gas channel forming members 31, 131 (231, 331) are arranged at the opposite sides of the membrane electrode assembly 15. However, the gas channel forming member according to the present invention may be arranged at only one of the sides of the membrane electrode assembly 15.

DESCRIPTION OF THE REFERENCE NUMERALS

10 . . . cell, 15 . . . membrane electrode assembly, 16 . . . polymer electrolyte membrane, 17 . . . first electrode catalyst layer, 18 . . . second electrode catalyst layer, 19 . . . first gas diffusion layer, 20 . . . second gas diffusion later, 23 . . . first separator, 24 . . . second separator, 31 . . . first gas channel forming member, 31a . . . inner protrusion, 31b . . . outer protrusion, 32 . . . gas channel, 33 . . . water channel, 33a . . . outlet opening, 34 . . . outlet section, 35 . . . upstream section, 36 . . . inner communication passage (communication passage), 37 . . . rib, 37a . . . outer section, 37b . . . inner section, 38 . . . outer communication passage, 231 . . . first gas channel forming member, 231a . . . base portion, 232 . . . gas channel, 233 . . . water channel, 233a . . . outlet opening, 234 . . . outlet section, 235 . . . upstream section, 236 . . . first projecting portion, 237 . . . communication hole, 238 . . . second projecting portion, 239 . . . communication hole, 240 . . . projection, F1, O1 . . . supply passage, F2, O2 . . . discharge passage.

The invention claimed is:

1. A gas channel forming member for a fuel cell having a separator and a membrane electrode assembly configured by holding a polymer electrolyte membrane between a pair of electrode catalyst layers, wherein the gas channel forming member is arranged between the membrane electrode assembly and the separator, the gas channel forming member comprising:
   a plurality of gas channels, which is formed on a surface facing the membrane electrode assembly;
   a plurality of water channels, which is formed on a surface facing the separator and, wherein each water channel has an outlet section; and
   a communication passage for allowing the gas channels and the water channels to communicate with each other, wherein
   fuel gas or oxidant gas flows through the gas channels,
   the water channels discharge generated water,
   the gas channels are arranged in parallel on the surface of the gas channel forming member facing the membrane electrode assembly,
   the water channels are arranged in parallel on the surface of the gas channel forming member facing the separator, the water channels are each arranged between an adjacent pair of the gas channels and extending linearly,
   each water channel has an upstream section, which is adjacent to the outlet section at an upstream side in a flow direction of the gas with the communication passage in between,
   each outlet section includes an outlet opening, and
   the flow cross-sectional area of each outlet opening is greater than the flow cross-sectional area of the upstream section.

2. The gas channel forming member according to claim 1, wherein the flow cross-sectional area of an outlet section including the outlet opening of each of the water channels is discretely increased in relation to the flow cross-sectional area of the upstream section.

3. The gas channel forming member according to claim 1, wherein the flow cross-sectional area of an outlet section including the outlet opening of each of the water channels is increased gradually toward the outlet opening.

4. The gas channel forming member according to claim 1, wherein the outlet opening of each of the water channels has a chamfered peripheral portion.

5. A fuel cell comprising:
   a membrane electrode assembly configured by holding a polymer electrolyte membrane between a pair of electrode catalyst layers;
   a separator arranged to face the membrane electrode assembly; and
   the gas channel forming member according to claim 1 arranged between the membrane electrode assembly and the separator.

* * * * *